US009696053B2

(12) United States Patent
Miwa et al.

(10) Patent No.: US 9,696,053 B2
(45) Date of Patent: Jul. 4, 2017

(54) THERMAL IMAGE SENSOR AND AIR CONDITIONER

(71) Applicant: MITSUBISHI ELECTRIC CORPORATION, Chiyoda-ku (JP)

(72) Inventors: Shotaro Miwa, Chiyoda-ku (JP); Makito Seki, Chiyoda-ku (JP); Shintaro Watanabe, Chiyoda-ku (JP); Takashi Matsumoto, Chiyoda-ku (JP)

(73) Assignee: Mitsubishi Electric Corporation, Chiyoda-ku (JP)

(*) Notice: Subject to any disclaimer, the term of this patent is extended or adjusted under 35 U.S.C. 154(b) by 0 days.

(21) Appl. No.: 14/911,393

(22) PCT Filed: Aug. 20, 2014

(86) PCT No.: PCT/JP2014/004249
§ 371 (c)(1),
(2) Date: Feb. 10, 2016

(87) PCT Pub. No.: WO2015/029378
PCT Pub. Date: Mar. 5, 2015

(65) Prior Publication Data
US 2016/0187022 A1    Jun. 30, 2016

(30) Foreign Application Priority Data
Aug. 28, 2013  (JP) ................. 2013-176948

(51) Int. Cl.
G01J 5/02        (2006.01)
F24F 11/00       (2006.01)
(Continued)

(52) U.S. Cl.
CPC ........ F24F 11/0034 (2013.01); F24F 11/006 (2013.01); G01J 5/0025 (2013.01);
(Continued)

(58) Field of Classification Search
CPC .......... G01N 21/8851; G01J 5/02; G01J 5/04
See application file for complete search history.

(56) References Cited

U.S. PATENT DOCUMENTS 5,006,711 A * 4/1991 Hamashima ............. G01J 5/02
                                                          250/332
5,519,426 A * 5/1996 Lukis ................... G06K 15/028
                                                          347/171
(Continued)

FOREIGN PATENT DOCUMENTS

GB       1517133 A  *  7/1978  ............... G01J 5/02
GB       2191059 A  * 12/1987  ............... H04N 3/09
(Continued)

OTHER PUBLICATIONS

International Search Report Issued Nov. 4, 2014 in PCT/JP14/04249 Filed Aug. 20, 2014.

Primary Examiner — Kiho Kim
(74) Attorney, Agent, or Firm — Oblon, McClelland, Maier & Neustadt, L.L.P.

(57) ABSTRACT

A thermal image sensor and an air conditioner in which temperature data of significant pixels selected from all the pixels in an immediately preceding step are acquired by a thinning scanner, a human probability for each of the significant pixels is generated by a human probability generator, weight values for all the pixels are generated from the human probabilities for the significant pixels by a pixel weight calculator, and pixels having a larger weight value are selected, as the significant pixels to be used in the next step, by an all-pixel sorter, thereby assigning a larger number of pixels to a region in which there is a high probability that a person is existing while the number of significant pixels used in total is kept constant.

20 Claims, 8 Drawing Sheets

(51) Int. Cl.
   *G01V 8/10*    (2006.01)
   *H04N 5/33*    (2006.01)
   *G01J 5/00*    (2006.01)

(52) U.S. Cl.
   CPC .............. *G01V 8/10* (2013.01); *H04N 5/33* (2013.01); *F24F 2011/0035* (2013.01); *F24F 2011/0061* (2013.01); *F24F 2011/0063* (2013.01); *G01J 2005/0077* (2013.01)

(56) References Cited

U.S. PATENT DOCUMENTS

| | | | |
|---|---|---|---|
| 2003/0112474 A1* | 6/2003 | Berstis ................... | H04N 1/03 358/471 |
| 2003/0151735 A1* | 8/2003 | Blumenfeld ....... | G01N 21/6428 356/73 |
| 2007/0187616 A1* | 8/2007 | Burroughs ........... | G02B 26/101 250/458.1 |
| 2013/0083082 A1* | 4/2013 | Bukesov ............ | C09K 11/7734 345/690 |

FOREIGN PATENT DOCUMENTS

| | | | |
|---|---|---|---|
| JP | 58180918 A | * | 10/1983 |
| JP | 03-071025 A | | 3/1991 |
| JP | 09-287913 A | | 11/1997 |
| JP | 10-142349 A | | 5/1998 |
| JP | 2009-092282 A | | 4/2009 |
| JP | 2010-159887 A | | 7/2010 |

* cited by examiner

| i | Dt |
|---|----|
| 1 | 27 |
| 2 | 20 |
| . | . |
| . | . |
| . | . |
| Nmax-2 | 28 |
| Nmax-1 | 20 |
| Nmax | 25 |

| i | s |
|---|---|
| 1 | 1 |
| 2 | 0 |
| . | . |
| . | . |
| . | . |
| Nmax-2 | 1 |
| Nmax-1 | 0 |
| Nmax | 0.5 |

| i | f(i) |
|---|---|
| 1 | 1 |
| 2 | 0 |
| . | . |
| . | . |
| . | . |
| Nmax-2 | 1 |
| Nmax-1 | 0 |
| Nmax | 1 |

| x | g(x) |
|---|---|
| 1 | 1 |
| 2 | 0.5 or 1 |
| . | . |
| . | . |
| . | . |
| Ns-2 | 1 or 1.5 |
| Ns-1 | 1 |
| Ns | 1 |

THERMAL IMAGE SENSOR AND AIR CONDITIONER

FIELD OF THE INVENTION

The present invention relates to a thermal image sensor and an air conditioner that make it possible to perform advanced human detection, such as detection of the individual parts and the posture of a person existing in a room.

BACKGROUND OF THE INVENTION

A conventional thermal image sensor consists of thermo piles arranged in a vertical direction, and scans this vertically-arranged sensor from left to right and from right to left in a constant cycle, thereby acquiring an entire thermal image of a room. At that time, the thermal image sensor acquires a thermal image of the entire room at the time of an initial startup, stores this thermal image as a background thermal image, and, after that, whenever the entire thermal image is newly acquired, calculates the difference between the entire thermal image and the background thermal image, and, when the difference value keeps a value equal to or greater than a human body detection threshold, determines that a person is existing at the corresponding pixel position (for example, patent reference 1).

RELATED ART DOCUMENT

Patent Reference

Patent reference 1: Japanese Unexamined Patent Application Publication No. 2009-92282

SUMMARY OF THE INVENTION

Problems to be Solved by the Invention

The thermal image sensor described in the Background of the Invention generates a thermal image by horizontally scanning a sensor in which a small number of low-cost thermo piles are arranged vertically, and applies picture processing to that thermal image. As a result, in an air conditioner which is needed to be produced at a low cost, low-cost human detection can be carried out. By using this human detection function, an air conditioning control operation of either strongly and frequently airing persons or not airing persons can be carried out. However, in an air conditioner with a higher degree of amenity, a function of avoiding a wind from directly hitting a person's face, a function of heating a person's feet in the winter, etc. are required, and high-accuracy human detection capable of carrying out detection of a human's parts is needed.

In the thermal image sensor described in the Background of the Invention, by increasing the number of thermo piles arranged in the vertical direction, this high-accuracy human detection can be implemented. However, a problem is that as the amount of acquired data increases with increase in that number of elements, an increase in the memory capacity required to store and process the data and an improvement in the CPU's ability for processing the data are required and hence there occurs a large increase in the cost of the sensor.

The present invention is made in order to solve the above-mentioned problem, and it is therefore an object of the present invention to provide a thermal image sensor and an air conditioner that can carry out high-accuracy human detection without having to increase the memory capacity and to improve the CPU's ability.

Means for Solving the Problem

In accordance with the present invention, there are provided a thermal image sensor and an air conditioner in which the thermal image sensor scans a thermal image acquirer to acquire temperature data of each of pixels arranged in a predetermined direction, on a per step basis in a direction vertical to the predetermined direction, and synthesizes a one-dimensional thermal image acquired in each step to acquire a thermal image in two dimensions, the thermal image sensor including: a significant pixel outputter to output the positions of detected significant pixels which are selected, as significant pixels, in an immediately preceding step from among all pixels which the thermal image acquirer has; a scanner to perform the scanning of one step to acquire the temperature data of the significant pixels; a human probability generator to use a relation between a human probability showing a probability that a person is existing and the temperature data to determine the human probability for each of the significant pixels; a pixel weight calculator to generate weight values for all the pixels on a basis of both a relative position of each pixel relative to each of the significant pixels and the temperature data; and an all-pixel sorter to select the detected significant pixels to be used in the next step in descending order of the weight values from among all the pixels.

Advantages of the Invention

In accordance with the present invention, high-accuracy human detection can be carried out without having to increase the memory capacity and to improve the CPU's ability.

EMBODIMENTS OF THE INVENTION

Embodiment 1

Figure 1:
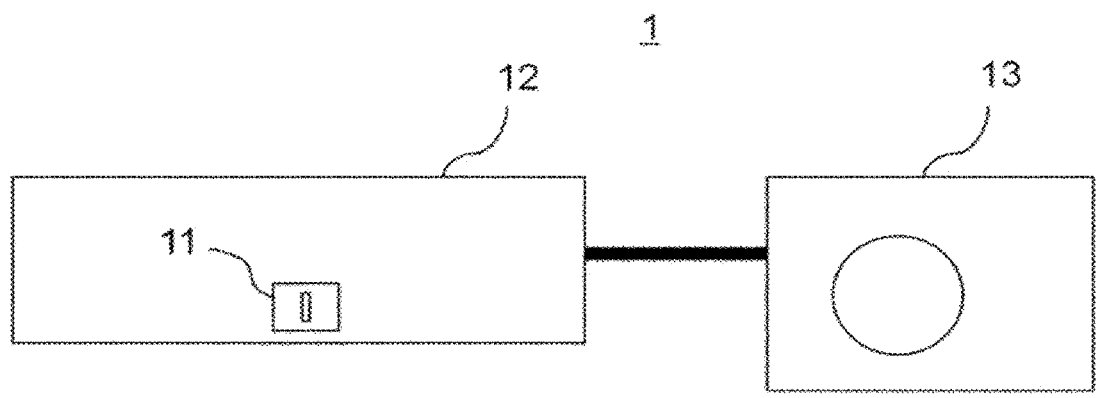
FIG. 1 is an explanatory drawing showing an example of the entire configuration of an air conditioner in which a thermal image sensor in accordance with Embodiment 1 of the present invention is mounted.

FIG. 1 is an explanatory drawing showing an example of the entire configuration of an air conditioner in which a thermal image sensor in accordance with Embodiment 1 of the present invention is mounted. The air conditioner 1 is configured with an interior unit 12 and an exterior unit 13. Further, the interior unit 12 is provided with the thermal image sensor 11.

Figure 2:
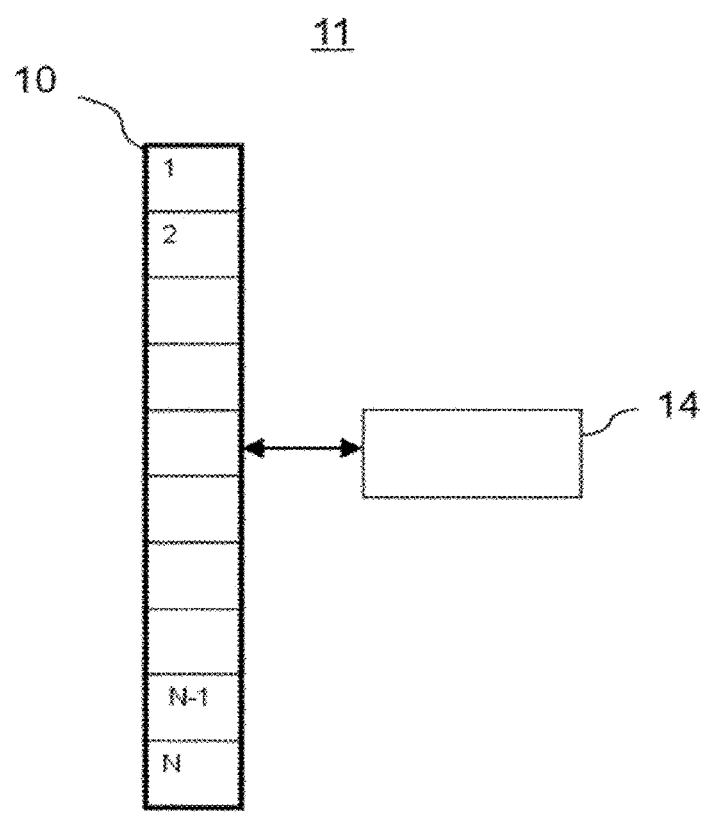
FIG. 2 is an explanatory drawing showing an example of the configuration of the thermal image sensor in accordance with Embodiment 1 of the present invention.

FIG. 2 is an explanatory drawing showing an example of the configuration of the thermal image sensor 11. The thermal image sensor 11 is provided with a thermal image acquirer 10 and a controller 14. The thermal image acquirer 10 is provided with, for example, thermo piles arranged in a vertical direction, and can acquire a one-dimensional thermal image. In the example shown in the drawing, the thermal image acquirer can acquire a one-dimensional thermal image of N pixels (N is a natural number). By scanning this vertically-arranged sensor from left to right or from right to left in a constant cycle, the thermal image acquirer acquires a thermal image of a room as a two-dimensional image. The controller 14 controls the acquisition of the thermal image by the thermal image acquirer 10, as well as the scanning. The position of each pixel in the thermal image acquirer 10 is defined to be the one measured in a direction from the top to the bottom, as shown in the drawing, and the position of the pixel at the top is defined to be 1 and the position of the pixel at the bottom is defined to be N. Although the case in which the thermal image acquirer 10 in which the pixels are arranged in the upward or downward direction as a predetermined direction is scanned in the rightward or leftward direction vertical to the predetermined direction will be explained in this embodiment, the present invention is not limited to that example. For example, the thermal image sensor can be alternatively configured in such a way that the pixels are arranged in the rightward or leftward direction and the thermal image acquirer is scanned in the upward or downward direction.

Figure 3:
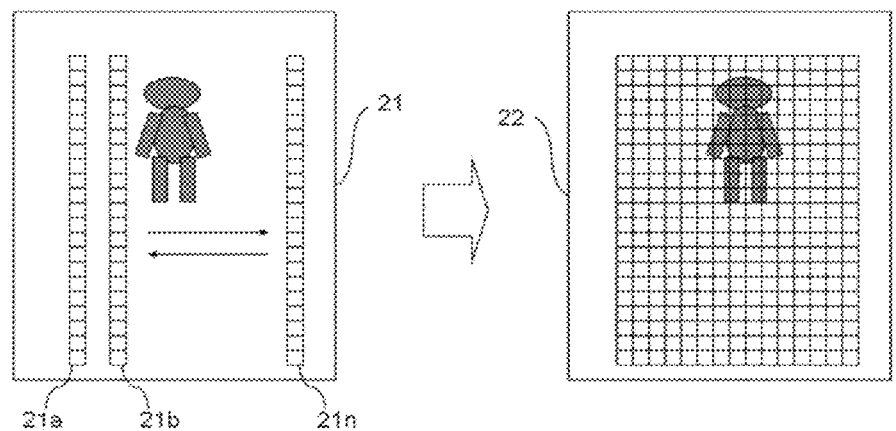
FIG. 3 is a diagram explaining a fundamental operation of acquiring a two-dimensional thermal image which is performed by a thermal image acquirer in accordance with Embodiment 1 of the present invention.

FIG. 3 is a diagram explaining a fundamental operation of acquiring a two-dimensional thermal image which is performed by the thermal image acquirer 10. The thermal image acquirer 10 acquires a vertical thermal image 21 which is a one-dimensional thermal image extending in the vertical direction by means of time division. By scanning the position at which to acquire a thermal image in a horizontal direction and then synthesizing the thermal image acquired at each position, the thermal image acquirer generates an entire room thermal image 22 which is a two-dimensional thermal image of an entire room. For example, a vertical thermal image 21a is acquired as a vertical thermal image 21 at a time t0. Further, a vertical thermal image 21b is acquired as a vertical thermal image 21 at a time t1. Further, a vertical thermal image 21n is acquired as a vertical thermal image 21 at a time tn. The thermal image acquirer 10 scans the position at which to acquire a thermal image from left to right or from right to left to acquire a vertical thermal image 21 at each horizontal position. The thermal image acquirer 10 synthesizes a plurality of vertical thermal images 21 acquired thereby, to generate an entire room thermal image 22. The scanning in the horizontal direction can be implemented by, for example, driving the thermo piles by using a stepping motor.

Figure 4:
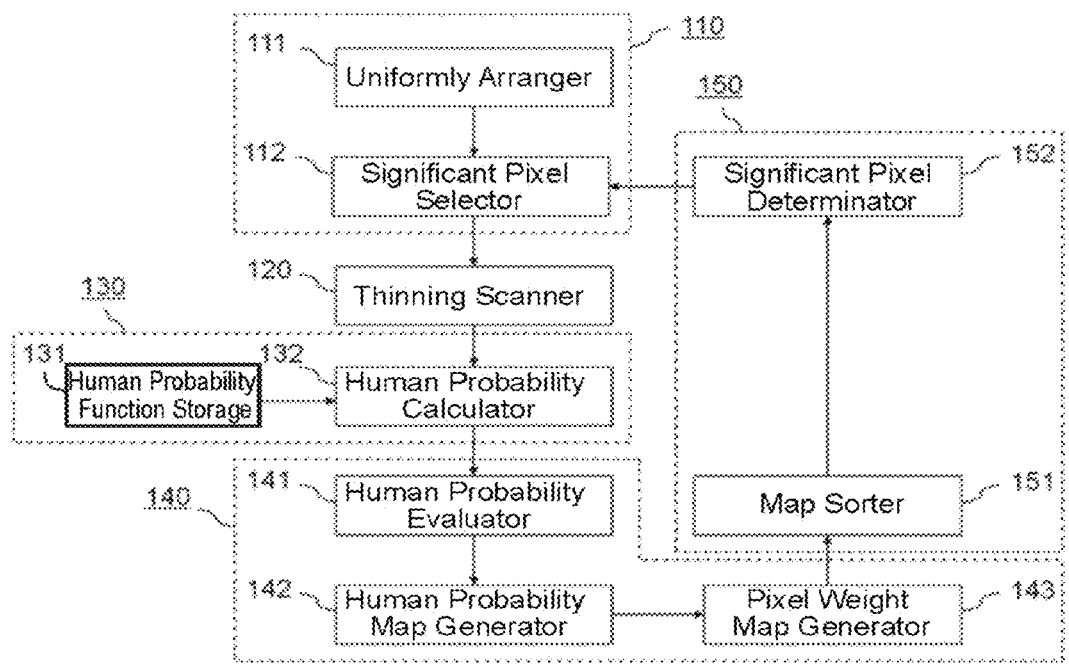
FIG. 4 is a diagram for explaining the operation of a controller in accordance with Embodiment 1 of the present invention.

FIG. 4 is a diagram for explaining the operation of the controller 14. The controller 14 determines significant pixels used for the acquisition of a thermal image from all the vertical pixels which the thermal image acquirer 10 has, according to a usable resource (=the number of usable pixels) permitted in the air conditioner 1, and generates a significant pixel index i for specifying each of the significant pixel, in a uniformly arranger 111. In that case, the number of significant pixels is less than the number of all the pixels. The position xi of the significant pixel corresponding to each significant pixel index is determined by using the following equation (1), where the number of all the pixels which the thermal image acquirer 10 has is expressed by Ns and the number of determined significant pixels is expressed by Nmax. At that time, each significant pixel index i is an integer ranging from 1 to Nmax.

[Equation 1]

$$xi = n*i, 1 \leq i \leq N\max \quad n = \mod(Ns/N\max) \quad (1)$$

Figures 5, 6:
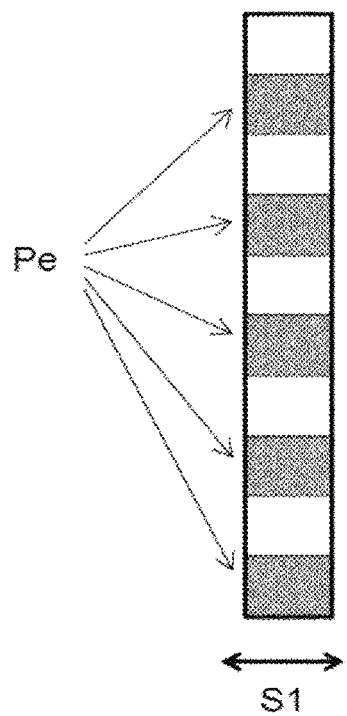
FIG. 5 is a diagram for explaining significant pixels determined by a uniformly arranger in accordance with Embodiment 1 of the present invention.
FIG. 6 is a diagram for explaining a thermal image acquired by a thinning scanner in accordance with Embodiment 1 of the present invention.

FIG. 5 is a diagram for explaining the significant pixels determined by the uniformly arranger 111. In the diagram, each rectangle denotes a pixel. Further, in the diagram, each significant pixel is denoted by Pe and is filled in with gray. In addition, S1 shown in the diagram denotes the scanning direction at the time of acquiring a thermal image. In the example shown in the diagram, the number of all the pixels which the thermal image acquirer 10 has is twice as large as the number of significant pixels. Those significant pixels which are uniformly arranged and which correspond to the significant pixel indexes i are referred to as initial significant pixels, and the positions xi of the initial significant pixels are referred to as initial significant pixel positions. The uniformly arranger 111 outputs the significant pixel indexes and the initial significant pixel positions.

In this embodiment, the uniformly arranger 111 functions as an initial arranger that determines the arrangement of the initial significant pixels. Although it is assumed that the uniformly arranger 111 arranges the initial significant pixels uniformly among all the pixels, the initial significant pixels do not necessarily have to be arranged completely uniformly, and can alternatively have an initial arrangement in which they are mostly arranged in a region in which there is a high probability that a person is detected.

Next, a significant pixel selector 112 selects and outputs the initial significant pixel positions determined by the uniformly arranger 111 when the value of a significant pixel selection flag is 0. When the value of the significant pixel selection flag is 1, the significant pixel selector selects and outputs detected significant pixel positions determined by a significant pixel determinator 152 which will be explained below. The value at the time of an initial setting of the significant pixel selection flag is 0, and, in the first operation, the initial significant pixel positions determined by the uniformly arranger 111 are selected. The uniformly arranger 111 and the significant pixel selector 112 operate as a significant pixel outputter 110 that outputs the positions of the significant pixels selected from among all the pixels.

A thinning scanner 120, which is a scanner, performs the thermal image scanning of one step in the rightward or leftward direction by using only the significant pixels defined by the significant pixel positions selected by the significant pixel selector 112, to acquire the temperature data of the significant pixels. The minimum unit for the thermal image scanning is defined to be one step, and the position at which to acquire a thermal image is changed by one step to acquire a thermal image. After the thermal image scanning of one step in the horizontal direction is completed, a one-dimensional thermal image which is the temperature data acquired for the significant pixels is acquired.

FIG. 6 is a diagram for explaining a thermal image acquired by the thinning scanner 120. The thermal image consists of the significant pixel indexes i and the temperature data Dt each acquired for the corresponding significant pixel. The temperature data Dt are expressed by, for example, degrees centigrade. The number of pixels of the thermal image acquired by the thinning scanner 120 is Nmax.

A human probability function storage 131 stores a human probability function which is set up in advance. A human probability calculator 132 converts the value of each of the significant pixels of the thermal image acquired by the thinning scanner 120 into a human probability s by using the human probability function. The human probability function storage 131 and the human probability calculator 132 operate as a human probability generator 130 that determines the human probability for each of the significant pixels.

Figures 7, 8:
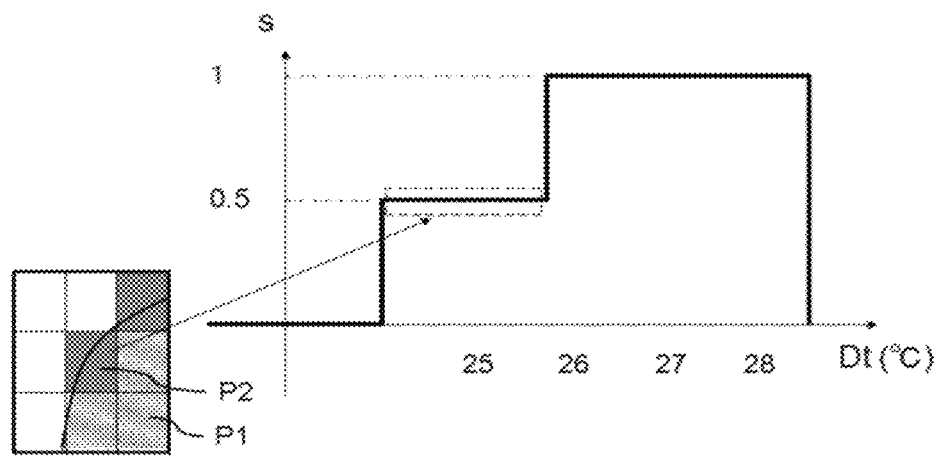
FIG. 7 is an example of a human probability function stored in a human probability function storage in accordance with Embodiment 1 of the present invention.
FIG. 8 is a diagram for explaining a human probability s determined by a human probability calculator in accordance with Embodiment 1 of the present invention.

FIG. 7 is an example of the human probability function stored in the human probability function storage 131. The human probability function shows a relation between the acquired temperature data Dt and the human probability s. The human probability is an index for estimating a probability that a person is existing at the position of the corresponding pixel, and is set in such a way as to have a value ranging from 0 to 1 and show that there is a higher probability that a person is existing with increase in the value thereof. A person's radiant heat has a temperature nearly equal to about 27 degrees, but depending upon the measurement part of the person. However, taking into consideration a case in which a person is existing only in a partial region of a significant pixel and a case in which attenuation of the radiant heat occurs due to clothes, the human probability function is set in such a way as to exhibit a certain human probability at lower temperatures. As an alternative, the human probability function can be defined by a mathematical expression or a table format. In FIG. 7, P1 denotes a pixel in which a person is existing, and P2 denotes a pixel in which a person is existing in only a part thereof. P2 is referred to as a partially matched pixel, and the human probability s is determined by the percentage of a person in the pixel and has a value ranging from 0 to 1.

FIG. 8 is a diagram for explaining the human probability s determined by the human probability calculator 132. The human probability s is generated while being brought into correspondence with the significant pixel index i. The human probability s shown in FIG. 8 is an example in the case of applying the human probability function shown in FIG. 7 to the thermal image shown in FIG. 6.

For the human probability s of each of the significant pixels acquired using the human probability function, a human probability evaluator 141 calculates a human flag f(i) indicating the presence or absence of a person by determining whether or not its value is large or small by using a threshold th1 for human probability. When the human probability s is equal to or greater than the threshold th1, the human probability evaluator determines that a person is existing, and calculates a human flag f(i) of 1, whereas when the human probability s is less than the threshold th1, the human probability evaluator determines that no person is existing, and calculates a human flag f(i) of 0. A human probability map generator 142 generates a human probability map D which consists of the significant pixel indexes i and the human flags f(i).

Figures 9, 10:
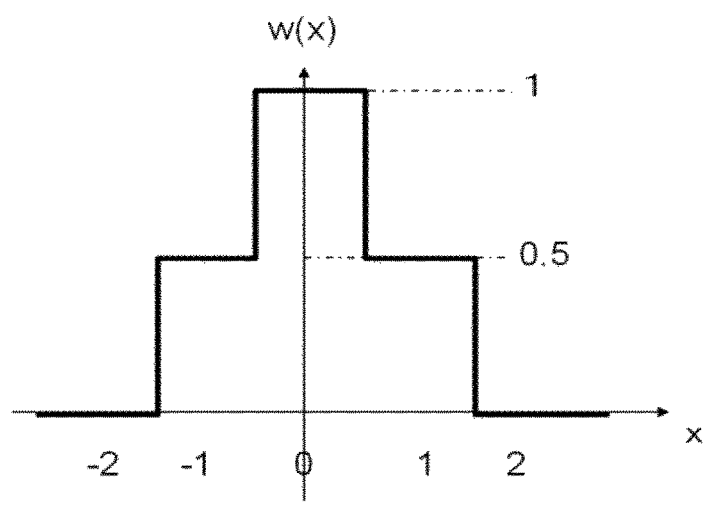
FIG. 9 is a diagram for explaining an example of the configuration of a human probability map D in accordance with Embodiment 1 of the present invention.
FIG. 10 is a diagram showing an example of a weighting function w(x) in accordance with Embodiment 1 of the present invention.

FIG. 9 is a diagram for explaining an example of the configuration of the human probability map D. The human probability map D is configured in such a way as to bring each of the significant pixel indexes i into correspondence with the human flag f(i) at the corresponding significant pixel. The human probability map D shown in FIG. 9 is an example in the case of setting the threshold th1 for human probability to 0.3 for the human probability s shown in FIG. 8. The threshold th1 for human probability has a value which is determined at the time when the thermal image sensor is designed, and is determined as appropriate by experiment or the like. In the air conditioner, a plurality of driving modes can be provided and a value different for each of the driving modes can be used as the threshold. As a result, the characteristic feature for detecting a person can be changed for each of the driving modes.

Although in this embodiment the human probability map D is configured in such a way that each significant pixel index i is brought into correspondence with the human flag f(i) at the significant pixel, the present invention is not limited to that example. For example, the human probability map D can be alternatively configured in such a way that each significant pixel index i is brought into correspondence the human probability s at the significant pixel. In that case, the probability that a person is existing at the corresponding significant pixel is not expressed by binary data, but is expressed by multi-valued data. Further, in that case, the process of calculating the human flag f(i) in the human probability evaluator 141 becomes unnecessary. More specifically, the human probability map D should just indicate numerically the probability that a person is existing at each of the significant pixels.

Next, a pixel weight map generator 143 calculates a weight value g(x) from a weighting function w(x) defined by equation (2), each significant pixel index i, the position xi of the significant pixel corresponding to the significant pixel index i, and the human flag f(i) according to equation (3), and generates a pixel weight map W which consists of the positions x of the pixels and the weight values g(x) at those pixel positions. According to the equation (3), the pixel weight map generator generates weight values for all the pixels containing the other pixels in addition to the significant pixels from the human flags determined only for the significant pixels.

[Equation 2]

$$w(x) = \begin{cases} 0.5, & \text{if } x = -1, 1 \\ 1, & \text{if } x = 0 \\ 0, & \text{otherwise} \end{cases} \quad (2)$$

[Equation 3]

$$g(x) = \sum_{i=1}^{N\_max} w(x - xi) * f(i) \quad (3)$$

FIG. 10 is a diagram showing an example of the weighting function w(x). The weighting function w(x) defines a weighting factor at the pixel position x relative to a pixel position serving as a reference, and the weighting factor becomes small with increase in the distance from the pixel position serving as the reference. In the equation (3), the relative pixel position relative to the position xi of a significant pixel is expressed by (x-xi).

Figures 11, 12:
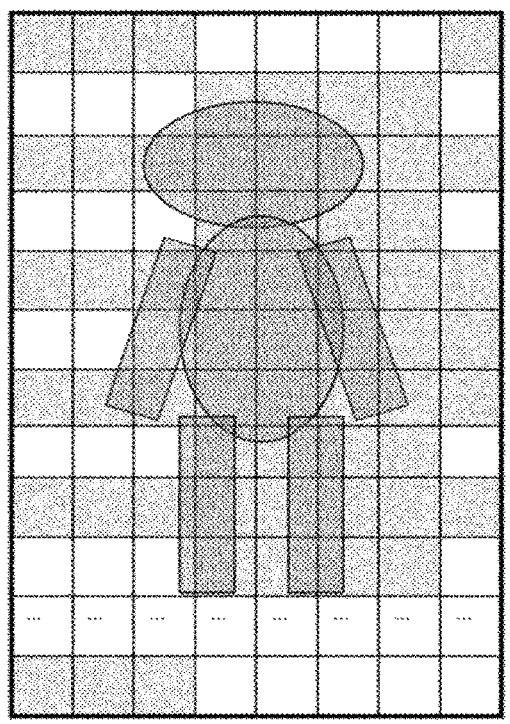
FIG. 11 is a diagram for explaining a pixel weight map W in accordance with Embodiment 1 of the present invention.
FIG. 12 is a conceptual drawing for visually explaining dynamic significant pixel arrangement in accordance with Embodiment 1 of the present invention.

FIG. 11 is a diagram for explaining the pixel weight map W. The pixel weight map W is configured in such a way as to bring the pixel position x of each of all the pixels which the thermal image acquirer 10 has into correspondence with the weight value g(x) at that pixel position.

The human probability evaluator 141, the human probability map generator 142 and the pixel weight map generator 143, which are described above, function as a pixel weight calculator 140 that generates the weight values for all the pixels from both the position of each pixel relative to that of each significant pixel, and the human probability.

A map sorter 151 compares the sum total of the weight values g(x) in the pixel weight map W with a predetermined threshold th2, and sets the value of the significant pixel selection flag according to the result of the comparison. When the sum total of the weight values g(x) is greater than the threshold th2, the map sorter sets the significant pixel selection flag to 1, whereas when the sum total of the weight value g(x) is equal to or less than the threshold th2, the map sorter sets the significant pixel selection flag to 0 which is the value at the time of the initial setting. The threshold th2 has a value which is determined at the time when the thermal image sensor is designed, and is determined as appropriate by experiment or the like. In the air conditioner, a plurality of driving modes can be provided and a value different for each of the driving modes can be used as the threshold. As a result, the characteristic feature for detecting a person can be changed for each of the driving modes.

Further, the map sorter 151 sorts the pixel weight map W by applying the following conditions 1 and 2 in the order of 1-2, to generate a significant pixel map W'. The condition 2 is the one for detection placing importance to a person's head rather than a person's feet, but is not an indispensable one. By adding the condition 2, a person's face or head sensitive to winds can be detected with a high degree of accuracy.

Condition 1: the weight value g(x) is large.

Condition 2: the pixel position x is small (gives a higher priority to a pixel at a higher position).

Next, the significant pixel determinator 152 selects Nmax pixels, Nmax being the number of significant pixels which is determined by the usable resource, in the order of the rows of the significant pixel map W', by using the significant pixel map W', determines those pixels as the detected significant pixels which are the significant pixels to be used for the next scanning, and outputs the significant pixel indexes and the pixel positions of the corresponding significant pixels.

The map sorter 151 and the significant pixel determinator 152, which are described above, function as an all-pixel sorter 150 that selects the detected significant pixels to be used in the next step in descending order of their weight values from among all the pixels.

As mentioned above, when the value of the significant pixel selection flag is 0, the significant pixel selector 112 selects and outputs the initial significant pixel positions determined by the uniformly arranger 111, whereas when the value of the significant pixel selection flag is 1, the significant pixel selector selects and outputs the detected significant pixel positions determined by the significant pixel determinator 152 which will be explained below.

The thinning scanner 120 performs the next scanning of one step in the rightward or leftward direction by using the significant pixels at the selected pixel positions. After that, until the horizontal scanning reaches either one of the right and left ends, the thermal image sensor repeats the processes by the human probability calculator 132, the human probability evaluator 141, the human probability map generator 142, the pixel weight map generator 143, the map sorter 151 and the significant pixel determinator 152. When the horizontal scanning reaches either one of the right and left ends, the controller 14 sets the significant pixel selection flag to 0 which is the value at the time of the initial setting, and then starts the operations from that of the uniformly arranger 111 again. At that time, the position at which to perform the scanning is also reset temporarily.

By thus assigning pixels to the pixel positions where there is a high probability that a person is existing while giving a higher priority to the pixel positions, the thermal image sensor performs dynamic significant pixel arrangement concentrated on a place where a person is existing. When the horizontal scanning reaches either one of the right and left ends, a two-dimensional thermal image in which pixels are assigned to the pixel positions where there is a high probability that a person is existing while a higher priority is given to the pixel positions is generated.

In the case of, after the horizontal scanning reaches either one of the right and left ends, continuously performing the horizontal scanning in a reverse direction from the position of the end, for example, in the case of, after the horizontal scanning in the rightward direction, continuously performing the horizontal scanning from the right end toward the leftward direction, the thermal image sensor does not necessarily have to set the significant pixel selection flag to 0, which is the value at the time of the initial setting, at the time of the first scanning of one step because the position at which to perform the scanning is close to the previous position. On the other hand, in the case of, after the horizontal scanning reaches either one of the right and left ends, temporarily resetting the scanning position and then performing the horizontal scanning in the same direction, for example, in the case of, after the horizontal scanning in the rightward direction, returning the scanning position to the left end and then restarting the horizontal scanning in the rightward direction, it is desirable to set the significant pixel selection flag to 0, which is the value at the time of the initial setting, at the time of the first scanning of one step because the position at which to perform the scanning is not close to the previous position. Although the thermal image sensor in accordance with this embodiment is configured in such a way as to, after the horizontal scanning reaches either one of the right and left ends, perform the horizontal scanning in the same direction after temporarily resetting the scanning position, the present invention is not limited to that example.

FIG. 12 is a conceptual drawing for visually explaining the dynamic significant pixel arrangement. In the drawing, rectangles denote pixels, and each pixel filled in with gray, among those pixels, represents a significant pixel assigned dynamically. Because a larger number of significant pixels are assigned to a region where there is a high probability that a person is existing, as shown in the drawing, the acquisition of a thermal image having a high resolution can be carried out and high-accuracy human detection which makes it possible to also detect body parts can be carried out. As mentioned above, a thermal image through the dynamic significant pixel arrangement is acquired by the thermal image sensor. Because no temperature data are acquired for any pixels other than the significant pixels in the acquired thermal image, by setting a predetermined value to those pixels, the value can be discriminated from the temperature data acquired for the significant pixels.

At the time of the first scanning of one step in the horizontal scanning, the thermal image sensor in accordance with this embodiment predetermines the significant pixels by uniformly thinning out all the pixels in the vertical direction, according to the number of usable pixels which is determined from the usable resource, and carries out the acquisition of data of one step in the vertical direction of a thermal image by using only those significant pixels. The thermal image sensor separately includes the human probability function storage that is a database in which temperature data based on a human radiant heat model are brought into correspondence with human probabilities, and, when completing the scanning of one step in the horizontal direction, determines whether or not a person is existing at each significant pixel position by calculating the human probability from the detected temperature data of the significant pixel and then performing a threshold process on the human probability, carries out the weighting in such a way that a larger number of significant pixels are contained in a portion in which a person is existing, and carries out the rearrangement of the significant pixels to use them in the next step.

As a result, because a larger number of pixels can be dynamically assigned to a region in which there is a high probability that a person is existing while the number of significant pixels used in total is kept constant, high-accuracy human detection can be carried out with the same resource as that at the time of a low number of pixels. The application of this thermal image sensor makes it possible to implement, for example, an air conditioner capable of detecting persons' faces, the positions of persons' hands and feet, and so on, and having a function of sending air while avoiding persons' faces, and heating persons' feet concentratedly.

As mentioned above, because in the thermal image sensor and the air conditioner in accordance with the present invention, the thermal image sensor scans the thermal image acquirer, which acquires temperature data of each of pixels arranged in the upward or downward direction, on a per step basis in the rightward or leftward direction, and synthesizes a one-dimensional thermal image acquired in each step to acquire a two-dimensional thermal image, and includes: the significant pixel outputter that outputs the positions of detected significant pixels which are selected, as significant pixels, in an immediately preceding step from among all the pixels which the thermal image acquirer has; the scanner that performs the scanning of one step to acquire the temperature data of the significant pixels; the human probability generator that uses a relation between a human probability showing a probability that a person is existing and the temperature data to determine the human probability for each of the significant pixels; the pixel weight calculator that generates weight values for all the pixels from both the relative position of each pixel relative to each of the significant pixels and the human probability; and the all-pixel sorter that selects the detected significant pixels to be used in the next step in descending order of the weight values from among all the pixels, high-accuracy human detection can be carried out without having to increase the memory capacity and to improve the CPU's ability.

Embodiment 2

Figure 13:
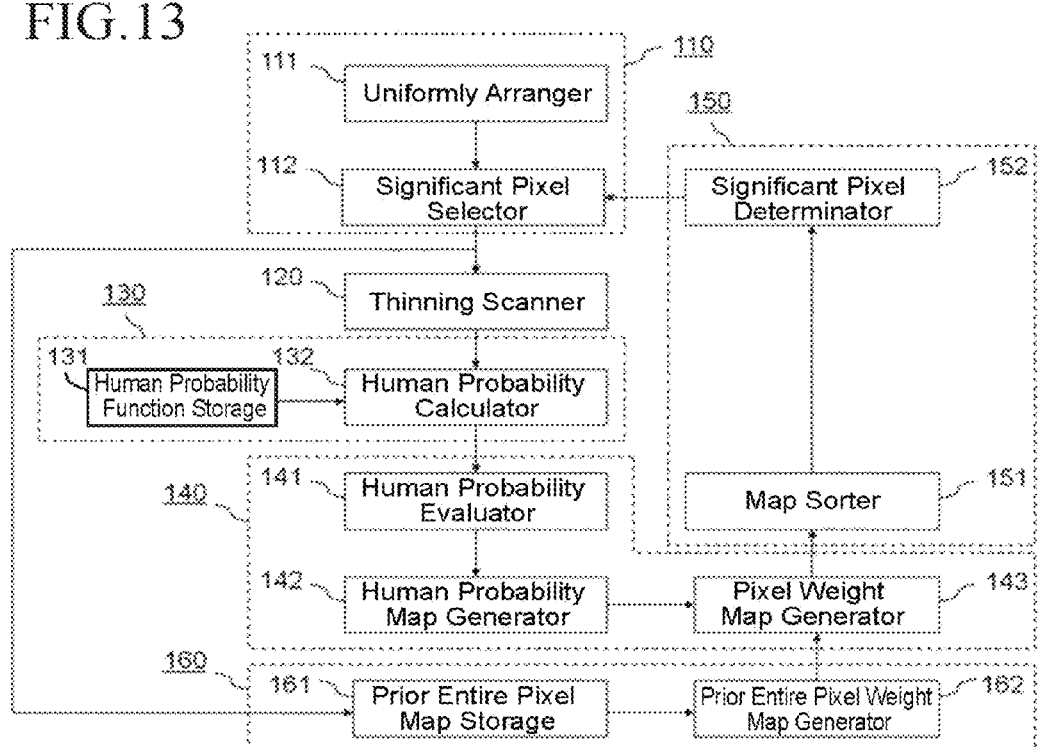
FIG. 13 is a diagram for explaining the operation of a controller which a thermal image sensor in accordance with Embodiment 2 of the present invention includes.

FIG. 13 is a diagram for explaining the operation of a controller 14 which a thermal image sensor in accordance with Embodiment 2 of the present invention has. The controller differs from that in accordance with Embodiment 1 in that a pixel weight map generator 143 operates in a different way and a prior weighting factor generator 160 configured with a prior entire pixel map storage 161 and a prior entire pixel weight map generator 162 is disposed. The configuration of the thermal image sensor in accordance with this embodiment is the same as that in accordance with above-mentioned Embodiment 1, and the thermal image sensor includes a thermal image acquirer 10 and the controller 14. The thermal image acquirer 10 is the same as that in accordance with above-mentioned Embodiment 1.

Figure 14:
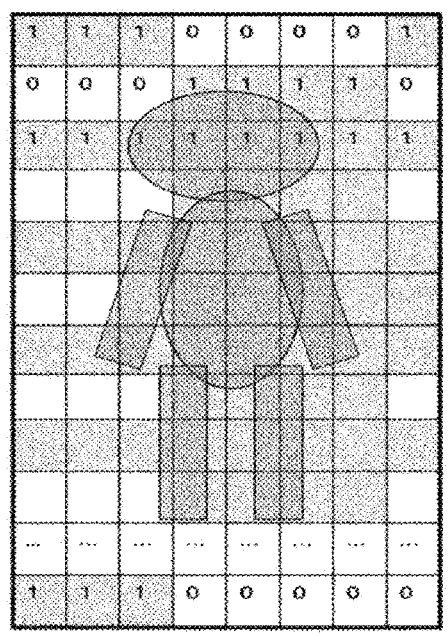
FIG. 14 is a diagram showing an example of a prior entire pixel map which a prior entire pixel map storage in accordance with Embodiment 2 of the present invention stores.

FIG. 14 is a diagram showing an example of a prior entire pixel map which the prior entire pixel map storage 161 stores. The prior entire pixel map M is a two-dimensional map showing the positions of pixels having a high frequency with which they have been selected as significant pixels within a predetermined time period which has elapsed until the latest one-way scanning in the rightward or leftward direction is completed, and showing a correspondence between the position of each pixel and a pixel value m(x, y). Each pixel having a high frequency with which it has been selected as a significant pixel has a value of m(x, y)=1, and each of other pixels has a value of m(x, y)=0. x shows the position in the upward or downward direction of the pixel, and y shows the position in the rightward or leftward direction of the pixel.

The prior entire pixel map storage 161 stores the number of times that each pixel has been used, as a significant pixel, during the predetermined time period. The controller determines the position of each pixel having a high frequency with which it has been selected as a significant pixel by comparing that number of times with a predetermined threshold th3, and generates the prior entire pixel map M. The predetermined time period and the threshold th3 have values which are determined at the time when the thermal image sensor is designed, and are determined as appropriate by experiment or the like. In an air conditioner, a plurality of driving modes can be provided and values different for each of the driving modes can be used as the predetermined time period and the threshold. As a result, the characteristic feature for detecting a person can be changed for each of the driving modes. When only an immediately preceding one-way scanning interval is set as the predetermined time period, the positions of the significant pixels in that scanning are determined as the positions of pixels having a high frequency with which they have been selected.

The prior entire pixel weight map generator 162 calculates a prior weighting factor g2(x, y) by using the prior entire pixel map M according to equation (4), and calculates a prior entire pixel weight map W2 configured with the pixel positions and the prior weighting factors g2(x, y) at those pixel positions.

[Equation 4]

$$g2(x, y) = \begin{cases} 1, \text{ if } m(x, y) = 1 \\ 0.5, \text{ otherwise} \end{cases} \quad (4)$$

Figure 15:
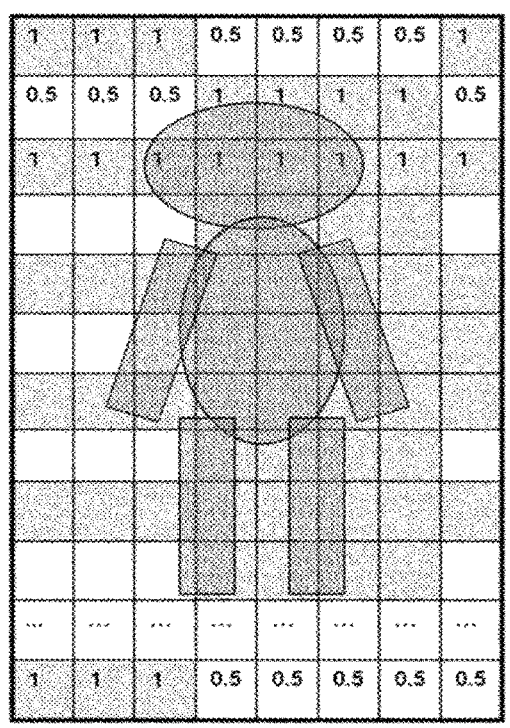
FIG. 15 is a diagram showing an example of a prior entire pixel weight map W2 in accordance with Embodiment 2 of the present invention.

FIG. 15 is a diagram showing an example of the prior entire pixel weight map W2. The prior entire pixel weight map W2 is a two-dimensional map having values of 1 or 0.5 with these values being respectively brought into correspondence with the position of the pixels. The prior entire pixel map storage 161 and the prior entire pixel weight map generator 162, which are described above, operate as a prior weighting factor generator 160 that generates a prior weighting factor having a larger value for a pixel having a higher frequency with which it has been selected, as a significant pixel, within the past predetermined time period.

The pixel weight map generator 143 generates a weight value g(x) at each scanning position y0 in the rightward or leftward direction for all the pixels in the upward or downward direction, like that in accordance with above-mentioned Embodiment 1. The pixel weight map generator further calculates a new weight value g3(x) by using both the weight value g(x) and the prior weighting factor g2(x, y0) at the scanning position y0 according to the following equation (5), and generates a pixel weight map W configured with the pixel position x in the upward or downward direction and the weight value g3(x) at that pixel position. Subsequent operations are the same as those in accordance with Embodiment 1.

[Equation 5]

$$g3(x) = g(x) * g2(x, y0) \quad (5)$$

As mentioned above, the thermal image sensor and the air conditioner in accordance with this embodiment include the prior weighting factor generator that generates the prior weighting factor having a larger value for a pixel having a higher frequency with which it has been selected, as a significant pixel, within the past predetermined time period, and the pixel weight calculator generates the weight value by also using the prior weighting factor. By thus determining the significant pixels which make it possible to acquire a thermal image while reflecting the result of the selection of the significant pixels during the past predetermined time period, there is provided an advantage of further improving the detection accuracy. There are many cases in which there is regularity in a person's sphere of activity. For example, in a case in which a sofa is placed in a living, there is a high probability that a person is existing at the position where the sofa is placed. Therefore, by using the accumulation of the results of selections performed in the past, the acquisition of thermal images can be carried out while a higher priority is given to the positions of pixels at which there is a higher probability that a person is existing, and the detection accuracy is further improved. Further, the same advantages as those provided by above-mentioned Embodiment 1 are provided.

EXPLANATIONS OF REFERENCE NUMERALS 1 air conditioner, 10 thermal image acquirer, 11 thermal image sensor, 12 interior unit, 13 exterior unit, 14 controller, 21, 21a, 21b, and 21n vertical thermal image, 22 entire room thermal image, 110 significant pixel outputter, 111 uniformly arranger, 112 significant pixel selector, 120 thinning scanner, 130 human probability generator, 131 human probability function storage, 132 human probability calculator, 140 pixel weight calculator, 141 human probability evaluator, 142 human probability map generator, 143 pixel weight map generator, 150 all-pixel sorter, 151 map sorter, 152 significant pixel determinator, 160 prior weighting factor generator, 161 prior entire pixel map storage, and 162 prior entire pixel weight map generator.

The invention claimed is:

1. A thermal image sensor that scans thermo piles to acquire temperature data of pixels of the thermo piles that are arranged in a predetermined direction, on a per step basis in a direction vertical to said predetermined direction, and that synthesizes a one-dimensional thermal image acquired in each step to acquire said thermal image in two dimensions, said thermal image sensor comprising:
   a controller coupled to a memory and configured to
      determine positions of detected significant pixels which are selected, as significant pixels, in an immediately preceding step from among all pixels of the thermo piles;
      scan to acquire said temperature data of said significant pixels;
      generate weight values for all said pixels on a basis of both a relative position of each pixel relative to each of said significant pixels and said temperature data; and
      select said detected significant pixels to be used in a next step in descending order of said weight values from among all said pixels.

2. The thermal image sensor according to claim 1, wherein the controller is further configured to use a relation between a human probability which is an index showing a probability that a person is existing and said temperature data to determine said human probability for each of said significant pixels, and to generate the weight values for all said pixels from both the relative position of each pixel relative to each of said significant pixels and said human probability.

3. The thermal image sensor according to claim 2, wherein the memory is configured to store a human probability function showing the relation between said human probability and said temperature data, and the controller is configured to determine said human probability for each of said significant pixels by using both said temperature data of said significant pixels and said human probability function.

4. The thermal image sensor according to claim 3, wherein said memory is further configured to store the relation between said human probability and said temperature data in a table format.

5. The thermal image sensor according to claim 4, wherein said controller is further configured to generate a prior weighting factor having a larger value for a pixel with a higher frequency with which the pixel has been selected as said significant pixel within a past predetermined time period, and to use said prior weighting factor to generate said weight values.

6. The thermal image sensor according to claim 4, wherein said predetermined direction is an upward or downward direction, and said controller is further configured to select said detected significant pixels in order from a pixel located at a higher position when said weight values are equal.

7. The thermal image sensor according to claim 3, wherein said controller is further configured to select initial significant pixels from all said pixels in such a way that the initial significant pixels have a predetermined initial arrangement, and to determine, as the significant pixels, said initial significant pixels at a time of an initial setting, and to determine, as the significant pixels, said detected significant pixels at a time other than the time of the initial setting.

8. The thermal image sensor according to claim 3, wherein said controller is further configured to generate a prior weighting factor having a larger value for a pixel with a higher frequency with which the pixel has been selected as said significant pixel within a past predetermined time period, and to use said prior weighting factor to generate said weight values.

9. The thermal image sensor according to claim 3, wherein said predetermined direction is an upward or downward direction, and said controller is further configured to select said detected significant pixels in order from a pixel located at a higher position when said weight values are equal.

10. The thermal image sensor according to claim 2, wherein said controller is further configured to generate a prior weighting factor having a larger value for a pixel with a higher frequency with which the pixel has been selected as said significant pixel within a past predetermined time period, and to use said prior weighting factor to generate said weight values.

11. The thermal image sensor according to claim 2, wherein said predetermined direction is an upward or downward direction, and said controller is further configured to select said detected significant pixels in order from a pixel located at a higher position when said weight values are equal.

12. The thermal image sensor according to claim 11, wherein said controller is further configured to select said initial significant pixels in such a way that said initial significant pixels are arranged uniformly among all said pixels.

13. The thermal image sensor according to claim 11, when a sum total of said weight values is equal to or less than a predetermined threshold, said thermal image sensor is set to said initial setting.

14. The thermal image sensor according to claim 11, wherein at a time of a first scanning of one step in said scanning, said thermal image sensor is set to said initial setting.

15. The thermal image sensor according to claim 2, wherein said controller is further configured to select initial significant pixels from all said pixels in such a way that the initial significant pixels have a predetermined initial arrangement, and to determine, as the significant pixels, said initial significant pixels at a time of an initial setting, and to determine, as the significant pixels, said detected significant pixels at a time other than the time of the initial setting.

16. The thermal image sensor according to claim 1, wherein said controller is further configured to generate a prior weighting factor having a larger value for a pixel with a higher frequency with which the pixel has been selected as said significant pixel within a past predetermined time period, and to use said prior weighting factor to generate said weight values.

17. The thermal image sensor according to claim 1, wherein said predetermined direction is an upward or downward direction, and said controller is further configured to select said detected significant pixels in order from a pixel located at a higher position when said weight values are equal.

18. The thermal image sensor according to claim 1, wherein said controller is further configured to select initial significant pixels from all said pixels in such a way that the initial significant pixels have a predetermined initial arrangement, and to determine, as the significant pixels, said initial significant pixels at a time of an initial setting, and to determine, as the significant pixels, said detected significant pixels at a time other than the time of the initial setting.

19. An air conditioner including a thermal image sensor that scans thermo piles to acquire temperature data of pixels of the thermo piles that are arranged in a predetermined direction, on a per step basis in a direction vertical to said predetermined direction, and that synthesizes a one-dimensional thermal image acquired in each step to acquire said thermal image in two dimensions, said thermal image sensor comprising:
    a controller coupled to a memory and configured to
    determine positions of detected significant pixels which are selected, as significant pixels, in an immediately preceding step from among all pixels of the thermo piles;
    scan to acquire said temperature data of said significant pixels;
    generate weight values for all said pixels on a basis of both a relative position of each pixel relative to each of said significant pixels and said temperature data; and
    select said detected significant pixels to be used in a next step in descending order of said weight values from among all said pixels.

20. The air conditioner according to claim 19, wherein said controller is further configured to use a relation between a human probability which is an index showing a probability that a person is existing and said temperature data to determine said human probability for each of said significant pixels, and to generate the weight values for all said pixels from both the relative position of each pixel relative to each of said significant pixels and said human probability.

* * * * *